United States Patent
Gabbai

(10) Patent No.: US 9,880,714 B2
(45) Date of Patent: Jan. 30, 2018

(54) DYNAMIC LOADING OF CONTEXTUAL ONTOLOGIES FOR PREDICTIVE TOUCH SCREEN TYPING

(71) Applicant: eBay Inc., San Jose, CA (US)

(72) Inventor: Jonathan Gabbai, London (GB)

(73) Assignee: eBay Inc., San Jose, CA (US)

( * ) Notice: Subject to any disclaimer, the term of this patent is extended or adjusted under 35 U.S.C. 154(b) by 539 days.

(21) Appl. No.: 14/528,857

(22) Filed: Oct. 30, 2014

(65) Prior Publication Data

US 2016/0125071 A1    May 5, 2016

(51) Int. Cl.
| | |
|---|---|
| *G06F 17/30* | (2006.01) |
| *G06F 3/0484* | (2013.01) |
| *G06F 17/27* | (2006.01) |
| *G06F 3/023* | (2006.01) |
| *G06Q 30/06* | (2012.01) |

(52) U.S. Cl.
CPC .......... *G06F 3/0484* (2013.01); *G06F 3/0237* (2013.01); *G06F 17/276* (2013.01); *G06F 17/3064* (2013.01); *G06F 17/30734* (2013.01); *G06Q 30/06* (2013.01)

(58) Field of Classification Search
CPC .......... G06F 17/3066; G06F 17/30864; G06F 17/30731; G06F 17/30867; G06F 3/0237; G06F 3/0481; G06F 3/0227
USPC ................ 707/706, 765, 791, 730; 704/235; 345/156
See application file for complete search history.

(56) References Cited

U.S. PATENT DOCUMENTS

| | | | | |
|---|---|---|---|---|
| 9,015,185 | B2 * | 4/2015 | Kanigsberg | G06F 17/30867 707/765 |
| 9,477,752 | B1 * | 10/2016 | Romano | G06F 17/30734 |
| 9,529,522 | B1 * | 12/2016 | Barros | G06F 3/0488 |
| 2006/0230033 | A1 * | 10/2006 | Halevy | G06F 17/243 |
| 2008/0294622 | A1 * | 11/2008 | Kanigsberg | G06F 17/30672 |
| 2010/0049766 | A1 | 2/2010 | Sweeney et al. | |
| 2011/0196852 | A1 * | 8/2011 | Srikanth | G06F 17/3066 707/706 |
| 2011/0219299 | A1 * | 9/2011 | Scalosub | G06F 17/276 715/261 |
| 2012/0023120 | A1 | 1/2012 | Kanefsky | |

(Continued)

FOREIGN PATENT DOCUMENTS

| | | |
|---|---|---|
| WO | WO-2009090262 A2 | 7/2009 |
| WO | WO-2009146528 A1 | 12/2009 |
| WO | WO-2016069869 A1 | 5/2016 |

OTHER PUBLICATIONS

"International Application Serial No. PCT/US2015/058001, International Search Report dated Mar. 3, 2016", 5 pgs.

(Continued)

*Primary Examiner* — Jean M Corrielus
(74) *Attorney, Agent, or Firm* — Shook, Hardy & Bacon L.L.P.

(57) ABSTRACT

A system comprising a computer-readable storage medium storing at least one program and a computer-implemented method for generating a navigable user interface for the dynamic loading of contextual ontologies for predictive typing. In some embodiments, the method may include receiving an input from a client device, gathering context data corresponding to the input, and providing a predictive typing entry based on the context data and the received input, in a navigable user interface.

16 Claims, 9 Drawing Sheets

(56) References Cited

U.S. PATENT DOCUMENTS

| | | | |
|---|---|---|---|
| 2012/0239395 A1* | 9/2012 | Foo | G06F 3/0237 704/235 |
| 2014/0163954 A1* | 6/2014 | Joshi | G06F 17/276 704/9 |
| 2014/0180868 A1* | 6/2014 | Kanigsberg | G06F 17/30867 705/26.7 |
| 2015/0286708 A1* | 10/2015 | Tao | G06F 17/30675 707/730 |

OTHER PUBLICATIONS

"International Application Serial No. PCT/US2015/058001, Written Opinion dated Mar. 3, 2016", 9 pgs.

\* cited by examiner

DYNAMIC LOADING OF CONTEXTUAL ONTOLOGIES FOR PREDICTIVE TOUCH SCREEN TYPING

TECHNICAL FIELD

This application relates to data processing. In particular, example embodiments may relate to systems and methods for dynamically loading contextual ontologies for predictive touch screen typing.

BACKGROUND

As mobile devices increase in popularity, various applications and interfaces have been developed to broaden the applications in which mobile devices may be used. As a result, an increasing number of people may use mobile devices for purposes other than simply conducting phone calls. However, because of frequent typographical errors (typos), and limited screen size, typing on mobile devices is often challenging. To remedy this, many mobile keyboards offer auto-complete suggestions for field entry as typing occurs. But these keyboard suggestions might not be applicable to a particular context in which a user is typing. When operating on a commerce site, for example, the words a user types are likely to relate to product names or features, with auto-complete suggestions being offered accordingly. The words may vary in different contexts, such as when composing a business email or texting a message to a friend.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Reference will now be made in detail to specific example embodiments for carrying out the inventive subject matter. Examples of these specific embodiments are illustrated in the accompanying drawings. It will be understood that they are not intended to limit the scope of the claims to the described embodiments. On the contrary, they are intended to cover such alternatives, modifications, and equivalents as may be included within the scope of the disclosure. In the following description, specific details are set forth in order to provide a thorough understanding of the subject matter. Embodiments may be practiced without some or all of these specific details. In accordance with the present disclosure, components, process steps, and data structures may be implemented using various types of operating systems, programming languages, computing platforms, computer programs, and/or general purpose machines.

Aspects of the present disclosure describe systems and methods for dynamically loading contextual ontologies for predictive touch screen typing. The context may include information relating to the current or prior communication session, or could be related to a transaction or query history of a user, the content of a website, or a word typed by the user. The context may also be highly granular—for example, when writing a listing for a car for sale, the contextual ontologies loaded for predictive typing may initially be specific to the category of cars, or even a particular type or model of car. If the user should then list a sofa for sale, a different contextual ontology may then be loaded. As used herein, a "user" or an "entity" may be a person (e.g., a human), a business (e.g., a company), an organization, a group of people, a persona (e.g., a fictitious character), a bot, or any combination thereof.

Context data representative of the context of the session may be automatically stored, consistent with some embodiments. In other embodiments, the method may include receiving user input, and in response to the user input, gathering the context data corresponding to the particular communication session, retrieving a corresponding ontology, presenting a predictive typing entry to the user based on the context data and the corresponding ontology, and updating the corresponding ontology based on the context data associated with the session and the user input.

The method may further include generating and causing the presentation of a text suggestion. In this manner, a user may be able to type on a mobile device and receive text suggestions based on the entered text which may be relevant to the particular context of the communication session.

Figure 1:
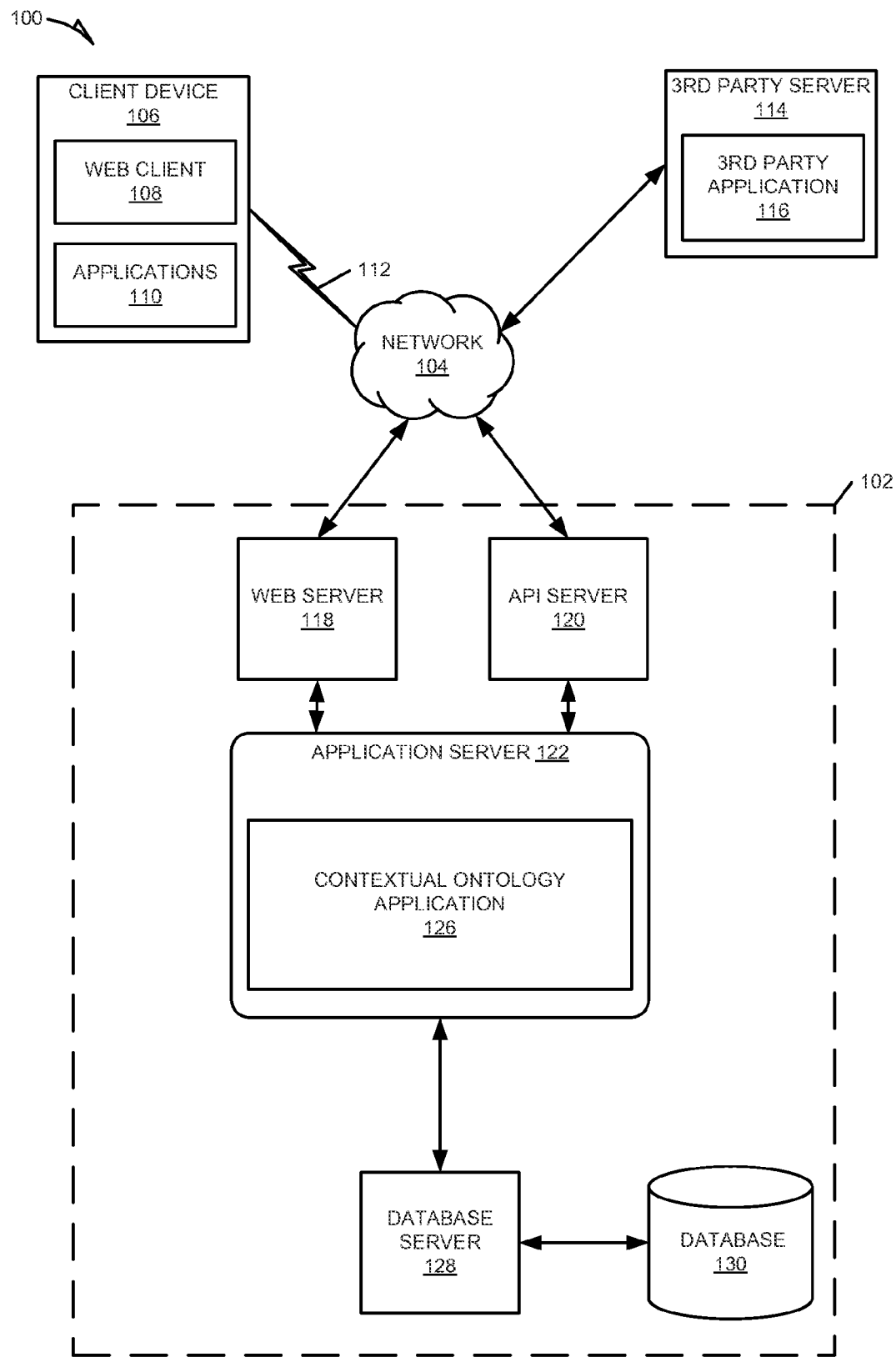
FIG. 1 is a network diagram depicting a network system having a client-server architecture configured for exchanging data over a network, according to an example embodiment.

FIG. 1 is a network diagram depicting a network system 100, according to one embodiment, having a client-server architecture configured for exchanging data over a network. The network system 100 may include a network-based content publisher 102 in communication with a client device 106 and a third party server 114. In some example embodiments, the network-based content publisher 102 may be a network-based marketplace.

The network-based content publisher 102 may communicate and exchange data within the network system 100 that may pertain to various functions and aspects associated with the network system 100 and its users. The network-based content publisher 102 may provide server-side functionality, via a communication network 104 (e.g., the Internet), to one or more client devices (e.g., client device 106). The one or more client devices may be operated by users that use the network system 100 to exchange data over the communication network 104. These transactions may include transmitting, receiving (communicating), and processing data to, from, and regarding content and users of the network system 100. The data may include, but are not limited to: images; video or audio content; user preferences; product and service feedback, advice, and reviews; product, service, manufacturer, and vendor recommendations and identifiers; product and service listings associated with buyers and sellers; product and service advertisements; auction bids; transaction data; and social data, among other things.

In various embodiments, the data exchanged within the network system 100 may be dependent upon user-selected functions available through one or more client or user interfaces (UIs). The UIs may be associated with a client device, such as the client device 106 using a web client 108. The web client 108 may be in communication with the network-based content publisher 102 via a web server 118. The UIs may also be associated with one or more applications 110 executing on the client device 106, such as a client application designed for interacting with the network-based content publisher 102, applications or services hosted by the network-based content publisher 102, or the third party server 114 (e.g., one or more servers or client devices) hosting a third party application 116.

The client device 106 may be any of a variety of types of devices. For example, the client device 106 may be a mobile device such as an iPhone® or other mobile device running the iOS® operating system, the Android® operating system, a BlackBerry® operating system, the Microsoft® Windows® Phone operating system, Symbian® OS, or webOS®. Consistent with some embodiments, the client device 106 may alternatively be a tablet computer, such as an iPad® or other tablet computer running one of the aforementioned operating systems. In some embodiments, the client device 106 may also be a personal digital assistant (PDA), a personal navigation device (PND), a handheld computer, a desktop computer, a laptop or netbook, a set-top box (STB) such as provided by cable or satellite content providers, a wearable computing device such as glasses or a wristwatch, a multimedia device embedded in an automobile, a Global Positioning System (GPS) device, a data enabled book reader, or a video game system console such as the Nintendo Wii®, the Microsoft Xbox 360®, the Sony PlayStation 3®, or other video game system consoles.

The client device 106 may interface via a connection 112 with the communication network 104 (e.g., the Internet or a wide area network (WAN)). Depending on the form of the client device 106, any of a variety of types of connection 112 and communication networks 104 may be used. For example, the connection 112 may be a Code Division Multiple Access (CDMA) connection, a Global System for Mobile communications (GSM) connection, or another type of cellular connection. Such a connection 112 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks). When such technology is employed, the communication network 104 may include a cellular network that has a plurality of cell sites of overlapping geographic coverage, interconnected by cellular telephone exchanges. These cellular telephone exchanges may be coupled to a network backbone (e.g., the public switched telephone network (PSTN), a packet-switched data network, or other types of networks).

In another example, the connection 112 may be a Wireless Fidelity (Wi-Fi, IEEE 802.11x type) connection, a Worldwide Interoperability for Microwave Access (WiMAX) connection, or another type of wireless data connection. In such an embodiment, the communication network 104 may include one or more wireless access points coupled to a local area network (LAN), a WAN, the Internet, or another packet-switched data network. In yet another example, the connection 112 may be a wired connection, for example an Ethernet link, and the communication network 104 may be a LAN, a WAN, the Internet, or another packet-switched data network. Accordingly, a variety of different configurations are expressly contemplated.

FIG. 1 also illustrates the third party application 116 executing on the third party server 114 that may offer one or more services to users of the client device 106. The third party application 116 may have programmatic access to the network-based content publisher 102 via the programmatic interface provided by an application program interface (API) server 120. In some embodiments, the third party application 116 may be associated with any organization that may conduct transactions with or provide services to the users of the client device 106.

Turning specifically to the network-based content publisher 102, the API server 120 and the web server 118 are coupled to, and provide programmatic and web interfaces respectively to, an application server 122. The application server 122 may further host a plurality of user accounts for users of the network-based content publisher 102, which may be stored in a database 130. As illustrated in FIG. 1, the application server 122 may also host a contextual ontology application 126, which may be configured to provide a predictive typing entry from a corresponding ontology for predictive text, based on the session context. Such predictive text may, for example, be presented on the client device 106.

As illustrated in FIG. 1, the application server 122 may be coupled via the API server 120 and the web server 118 to the communication network 104, for example, via wired or wireless interfaces. The application server 122 is, in turn, shown to be coupled to a database server 128 that facilitates access to the database 130. In some examples, the application server 122 can access the database 130 directly without the need for the database server 128. In some embodiments, the database 130 may include multiple databases that may be internal or external to the network-based content publisher 102.

The database 130 may store data pertaining to various functions and aspects associated with the network system 100 and its users. For example, user accounts for users of the network-based content publisher 102 may be stored and maintained in the database 130. Each user account may comprise user data that describes aspects of a particular user. The user data may include demographic data, user preferences, and financial information. The demographic data may, for example, include information describing one or more characteristics of a user. Demographic data may, for example, include gender, age, location information, employment history, education history, contact information, familial relations, or user interests. The financial information may, for example, include private financial information of the user such as account number, credential, password, device identifier, user name, phone number, credit card information, bank information, transaction history or other financial information which may be used to facilitate online transactions by the user. Consistent with some embodiments, the transaction history may include information related to transactions for items or services (collectively referred to as "products") that may be offered for sale by merchants using marketplace services provided by the network-based content publisher 102. The transaction history information may, for example, include a description of a product purchased by the user, an identifier of the product, a category to which the product belongs, a purchase price, a quantity, or a number of bids.

The user data may also include a record of user activity, consistent with some embodiments. Each user session may be stored in the database 130 as session data, and such session data may be maintained as part of the user data about each user. Accordingly, in some embodiments, the user data may include past keyword searches that users have performed, web pages viewed by each user, products added to a user wish list or watch list, products added to an electronic shopping cart, and products that the users own. User preferences may be inferred from the user activity.

While the marketplace application 124 and the contextual ontology application 126 are shown in FIG. 1 to both form part of the network-based content publisher 102, it will be appreciated that, in alternative embodiments, the contextual ontology application 126 may form part of a service that is separate and distinct from the network-based content publisher 102. Further, while the network system 100 shown in FIG. 1 employs a client-server architecture, the present inventive subject matter is, of course, not limited to such an architecture, and could equally well find application in an event-driven, distributed, or peer-to-peer architecture system, for example. The various modules of the application server 122 may also be implemented as standalone systems or software programs, which do not necessarily have networking capabilities. It shall be appreciated that although the various functional components of the network system 100 are discussed in the singular sense, multiple instances of one or more of the various functional components may be employed.

Figure 2:
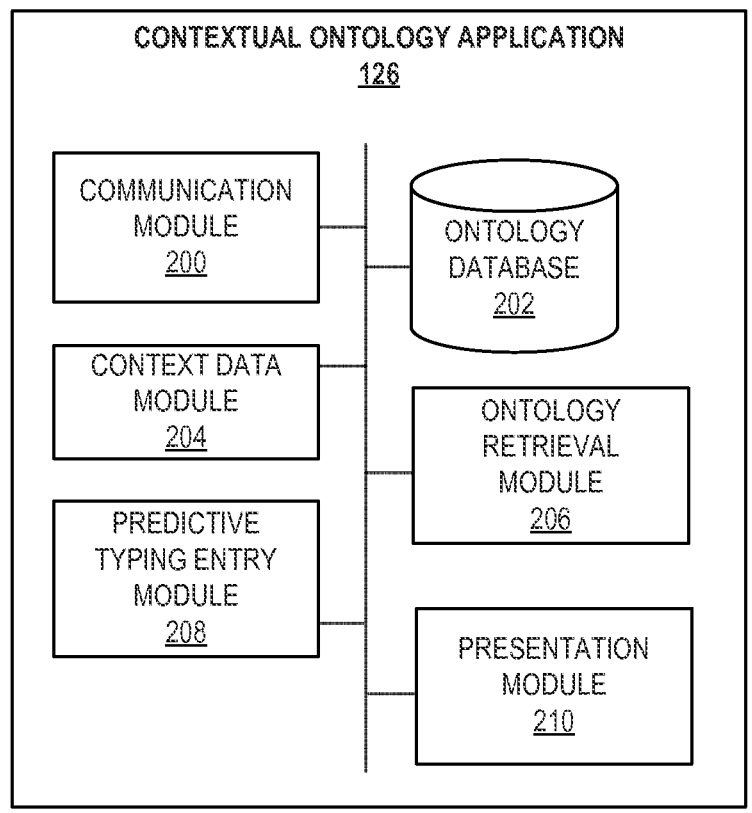
FIG. 2 is a block diagram illustrating an example embodiment of multiple modules forming a contextual ontology application, which is provided as part of the network system of FIG. 1.

FIG. 2 is a block diagram illustrating an example embodiment of multiple modules forming the contextual ontology application 126, which is provided as part of the network-based content publisher 102. The contextual ontology application 126 is shown as including a communication module 200, a context data module 204, an ontology retrieval module 206, a predictive typing entry module 208, a presentation module 210, and an ontology database 202, all configured to communicate with each other (e.g., via a bus, shared memory, a switch, or application programming interfaces (APIs)). The various modules of the contextual ontology application 126 may access the databases 130 via the database server 128, and each of the various modules of the contextual ontology application 126 may be in communication with one or more of the third party applications 116. Further, the various modules of the contextual ontology application 126 may access a machine-readable memory of the client device 106.

Consistent with some embodiments, the communication module 200 may be configured to receive user input generated by one or more input/output (I/O) devices that may be included with or communicatively coupled to the client device 106. Depending on the form of the client device 106, the I/O devices may, for example, be a mouse, a track pad, a keypad, a keyboard, a multi-touch sensing surface (e.g., a touchscreen or trackpad), a microphone, a speaker, a camera, and the like. The user input may be received by one of the aforementioned I/O devices and, in some embodiments, transmitted to the application server 122 for receipt by the communication module 200.

The ontology database 202 may be configured to store one or more contextual ontologies which may be accessed by the ontology retrieval module 206. In some embodiments, ontologies in the ontology database may be defined as compositions of two or more increasingly specific ontology components. For example, an ontology related to "Cars" may be composed of multiple increasingly narrow ontology components, such as an ontology representing "American Cars," an ontology representing "American Cars made by Chevrolet," and so on.

The context data module 204 may be configured to capture and store context data that is representative of a communication session and may be used to recall the content of the communication session at a later time. Context data refers to the content of a particular web site or application environment accessed by one or more applications 110 executing on a client device (e.g., client device 106). Example context data includes elements that describe the content and subject of a particular communication session, a user transaction history, a user query history, or actions performed by a user when conducting an online transaction, completing an online form, taking an online survey, writing an email, and creating a listing.

The context data may include interactions of the client device 106 with the application server 122, such as information provided by a user, buttons (or other visual indicators) activated by the user, an identification of steps completed by the user, keystrokes, cursor and pointer movements, actions canceled by the user, and other types of clickstream data. Accordingly, the context data module 204 may be configured to monitor, track, and record the activities and interactions of a user, using one or more devices (e.g., client device 106), with the various modules of the network system 100.

The ontology retrieval module 206 may be configured to retrieve a corresponding ontology from the ontology database 202, based on the context of a communication session. In some embodiments, the user may manually specify a particular ontology to use through a user interface. The corresponding ontology provided to the user will then allow the predictive typing entry module 208 to generate more relevant and accurate predictive typing entries, based on the corresponding context data.

In some embodiments, the ontology retrieval module 206 may also be configured to regularly create ontologies to populate the ontology database 202. For example, the ontology retrieval module 206 may regularly receive context data from a website or online marketplace. The ontology retrieval module may then use the gathered context data to create up to date and relevant ontology which may then be delivered to the predictive typing entry module 208 in order to create a predictive typing entry for the user.

The ontology retrieval module 206 may be further configured to pre-cache a corresponding ontology based on a user history as well as the context data. The user history may include information related to previous listings created by the user, such as item attributes, location attributes, and pricing information. In some embodiments, the ontology retrieval module 206 may also assign a rank to the corresponding ontology, and then select the corresponding ontology based on the relative rank with a particular user. The assigned rank may be based on relevance to a particular context, total usage by a particular user, or frequency of use overall, or usage behavior. In other embodiments, the assigned rank may be based on a conversion rate, or return on investment associated with a particular ontology, wherein a higher conversion rate or return on investment corresponds with a higher ranking among the other ontology within the ontology database 202. A conversion rate is defined as the percentage of visitors to a particular website who complete a goal, as set by the site owner.

The ontology retrieval module 206 may be further configured to create a new ontology based upon user input and user behavior. For example, a user may regularly use a particular word or phrase in conjunction with a particular context. The ontology retrieval module 206 may therefore assemble a corresponding ontology for the unique context, and store the ontology in the ontology database 202. In further embodiments, the ontology retrieval module 206 may also update the new ontology based on the real-time user inputs. In further embodiments. The ontology retrieval module 206 may further be configured to update the corresponding ontology based on the user inputs and context data. In doing so, the ontology may accurately correspond to a particular user's needs.

In some embodiments, the ontology retrieval module 206 may be configured to dynamically retrieve an ontology as the context data module 204 collects corresponding context data. In other embodiments, the ontology retrieval module 206 may be further configured to retrieve increasingly narrow ontologies from the ontology database 202. In even further embodiments, the ontology retrieval module 204 may be configured to retrieve two or more corresponding ontology, including a baseline ontology and a category specific ontology, so that the keywords, text predictions, and sequences that are generic don't have to be loaded again.

In other embodiments, the ontology retrieval module 206 may be configured to retrieve and stream an ontology to the user, starting with the most frequently used keywords within the corresponding ontology. For example, upon selecting an ontology for use based on the context data, the ontology retrieval module 206 may stream the most frequently used keywords by the user from with that corresponding ontology, ensuring that predictive typing entry module 208 can begin generating predictive typing suggestions immediately.

The predictive typing entry module 208 may be configured to provide a predictive typing entry based on one or more parameters in conjunction with the corresponding ontology retrieved by the ontology retrieval module 206. In some embodiments, the parameters may include the received user input, a user history, and context data surrounding the particular communication session. The predicted text may be in the form of words or phrases, or in further embodiments be a predicted price range, location prediction, or time frame, based on the context data. In one example embodiment consistent with some embodiments, if a user is listing a pair of Ray-Ban sunglasses for sale, the predictive typing entry module 208 may provide the user with text suggestions which may not otherwise be suggested outside of that particular context, such as for words and phrases which are most commonly used in conjunction with sunglasses, or even more specifically, Ray-Ban sunglasses. In further embodiments, the predictive typing entry module 208 may also suggest a price range or time limit for the listing based on other similar listings for similar sunglasses.

The presentation module 210 may be configured to present the text suggestion from the predictive typing entry module 208 to the user. In some embodiments, the text suggestion may be provided to the user as a user selectable option, which the user can choose to accept or deny. In further embodiments, the presentation module 210 may present two or more predictive typing entries to the user, from which the user may select.

After the user has selected or rejected a suggested predictive typing entry, the presentation module 210 may respond by communicating the response to the predictive typing entry module 208. The predictive typing entry module 208 may then determine whether the particular ontology selected by the ontology retrieval module 206 is accurate for the particular context. In some embodiments, the predictive typing entry module 208 may then query the ontology retrieval module 206 for a different ontology, or may update the ontology with information from the particular context in order to create more accurate ontologies for future use.

Figure 3:
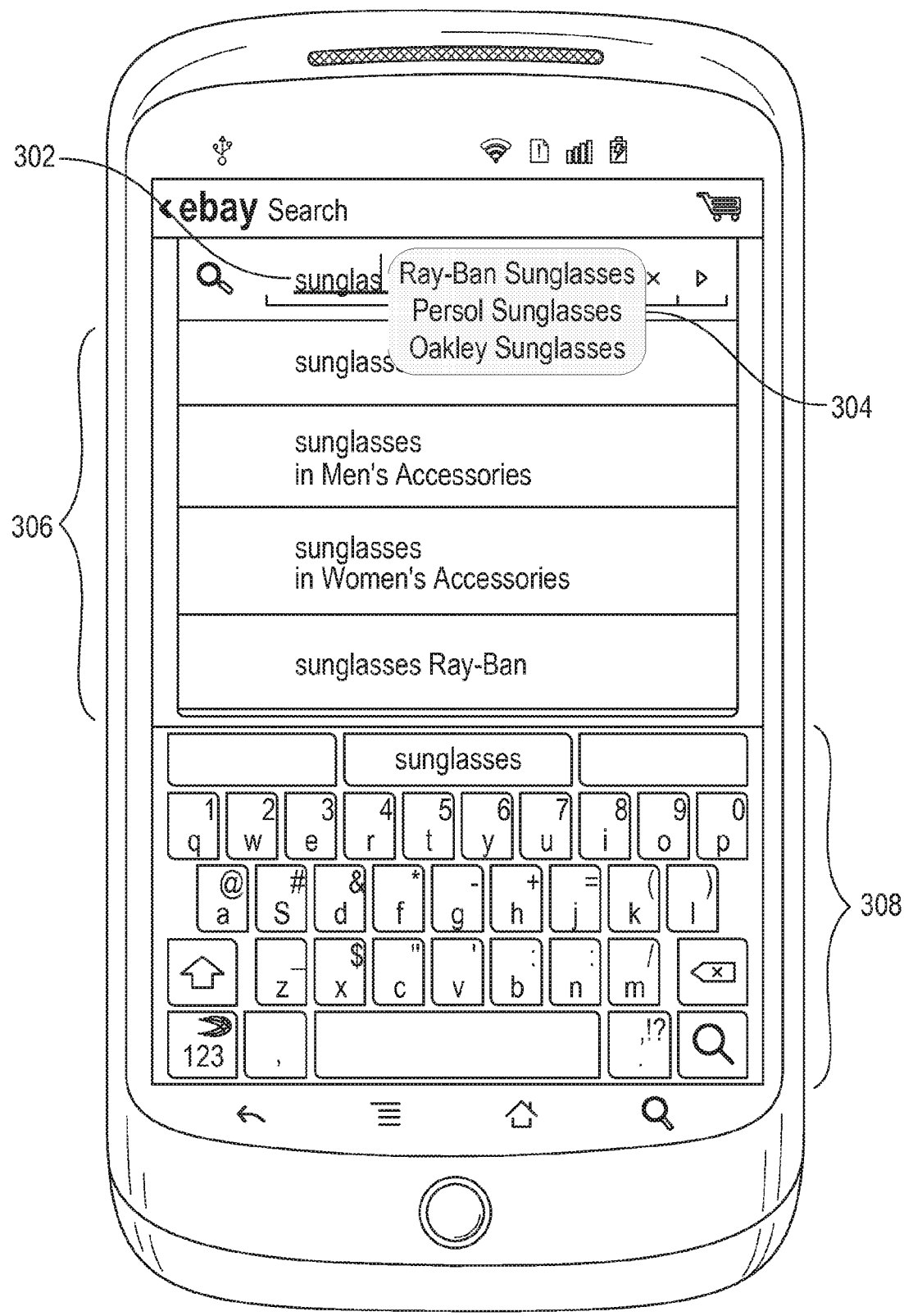
FIG. 3 is an interface diagram depicting an example communication session, consistent with some embodiments.

FIG. 3 is an interface diagram depicting an example communication session, consistent with some embodiments. The first client device illustrated in FIG. 3 may correspond to the client device 106 of FIG. 1. As illustrated in FIG. 3, the example communication session may include a user input 302, input by a user on an interface displayed on the client device 106 through a keyboard 308, which may be transmitted as a request to the application server 122.

As illustrated, the user input 302 may be a search request in an online marketplace application, which may generate search results 306. In some example embodiments, a user typing the user input 302 may be provided with a contextual text suggestion 304 based on a corresponding ontology, the user input 302, context data, and the user history. The context data may include information specific to a particular category, item type, or web site content, as well as the subject matter of the user input 302 itself. The user history may include information corresponding to a particular user, such as user profile information, previous search requests, a transaction history, and user selected preferences. For example, consistent with some example embodiments, the user may begin typing a search query using the communication module 200. In response to the entry, the context data module 204 may gather corresponding context information, as well as information associated with the user history and the user input, which it may then provide to the ontology retrieval module 206. Once the ontology retrieval module 206 receives the context data, a corresponding ontology may be provided to the predictive typing entry module 208, in order to provide the user with an accurate, contextual predictive typing entry. The ontology retrieval module 206 may store and retrieve ontologies in the ontology database 202. Once a corresponding ontology has been selected by the ontology retrieval module 206, the predictive typing entry module 208 may use the corresponding ontology to generate the contextual text suggestions 304. The contextual text suggestions 304 may then be provided to the presentation module 210, which presents the contextual text suggestions 304 to the user.

In some example embodiments, the presentation module 210 may provide the user with a single contextual text suggestion 304; however, in other embodiments the presentation module 210 may present two or more contextual text suggestions 304, from which a user may select. Upon the user selecting a suggestion, the presentation module may respond by providing the selection to the context data module 204, in order to refine the ontology to better fit the specific context.

Figure 4:
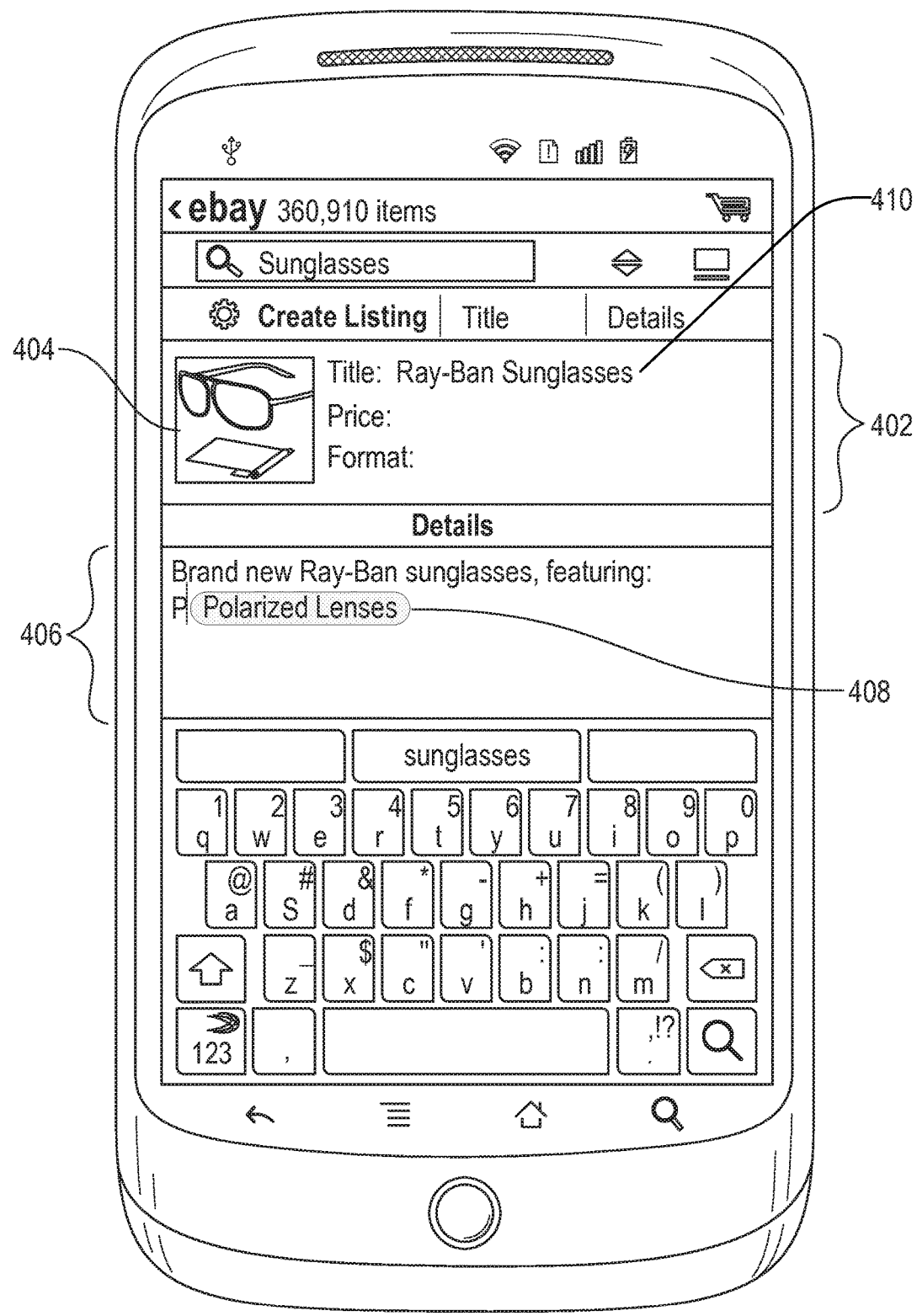
FIG. 4 is an interface diagram depicting further exchanges of the example communication session, consistent with some embodiments.

Turning our attention to FIG. 4, an interface diagram depicting a user entering details for a listing in an online marketplace, consistent with some embodiments, is illustrated. As shown, the user may wish to fill in relevant details related to the posting in a detail field 406. In some example embodiments, the contextual ontology application 126 may be configured to provide a user with a text suggestion 408. The text suggestion 408 may be based upon the context and parameters of a listing 402, such as an image 404 which represents the item, as well as a listing title 410. The context data module 204 may be configured to recognize context data from a corresponding image. For example, a user may upload or otherwise provide an image 404 which may identify a particular item to be used in a listing. The context data module 204 may then identify the image and deliver the associated data to the ontology retrieval module 206, which may then retrieve a corresponding ontology based on the image 404. The contextual ontology application 126 may then provide the user with the text suggestion 408, which the user may then decide whether or not to use through selection.

In further embodiments, the contextual ontology application 126 may be configured to dynamically provide a user with increasingly specific ontologies as more context data is gathered by the context data module 204. For example, once the context data module 204 identifies that the image 404 represents a pair of sunglasses, a corresponding ontology for sunglasses may be provided to the user to generate relevant text suggestions. As the user types and adds detail to the listing, for example by adding a listing title 410 which specifies a brand or type of sunglasses, the context data module 204 may dynamically identify these relevant attributes, and provide the user with a narrower ontology, for example an ontology corresponding to Ray-Ban sunglasses specifically. As the user continues to add details to the context of the listing, the context data module 204 will continue to dynamically identify and provide the data to the ontology retrieval module 206, in order to provide the user with the most relevant ontology or ontologies possible.

Figure 5:
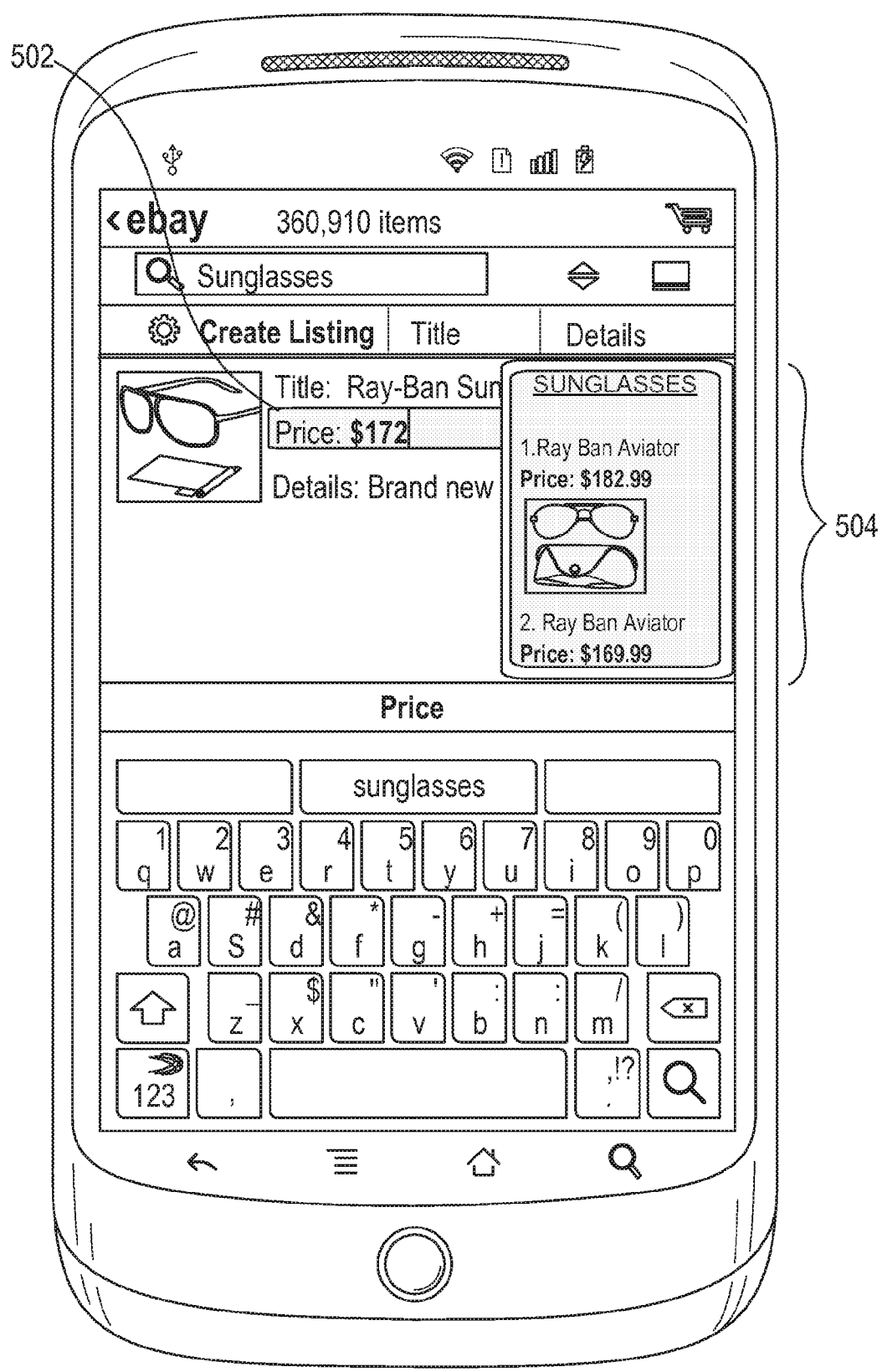
FIG. 5 is an interface diagram depicting further exchanges of the example communication session, consistent with some embodiments.

FIG. 5 illustrates an interface diagram of an example scenario in which a user wishes to add price information 502 to a listing in an online marketplace. In some example embodiments, the contextual ontology application 126 may also be configured to provide a user with a price suggestion 504. For example, the context data module 204 may recognize that a user is creating a listing in an online marketplace, based on relevant context data. The context data module 204 may then collect pricing information relevant to the current listing by retrieving pricing information for other similar listings, or from the user's prior transaction history. The presentation module 210 may then present the price suggestions 504 to the user, for user selection.

Figure 6:
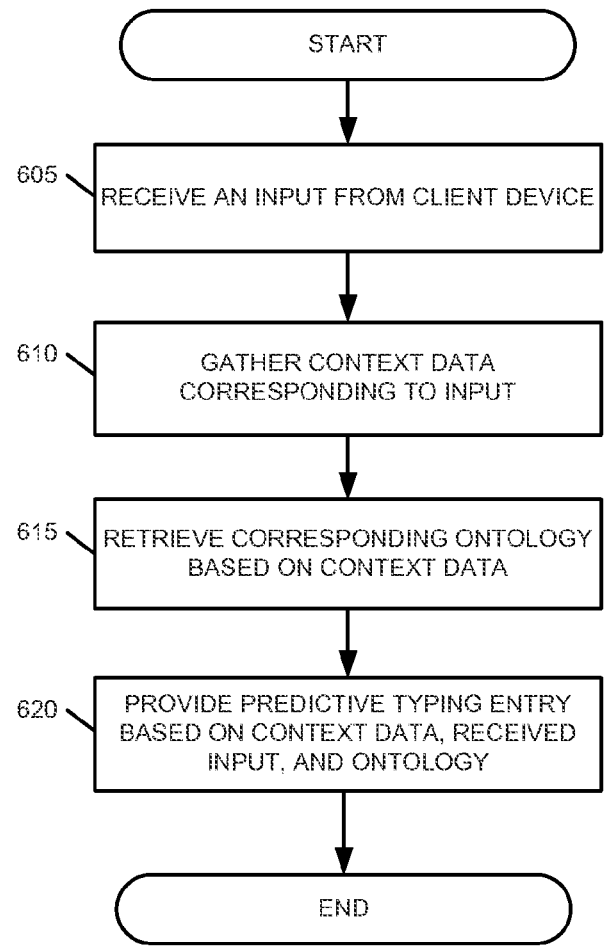
FIG. 6 is a flowchart illustrating an example method for providing a context based predictive typing entry, consistent with some example embodiments.

FIG. 6 is a flowchart illustrating an example method 600 for providing a predictive typing entry to a user based on the context data, the received input, and the corresponding ontology. The method 600 may be embodied in computer-readable instructions for execution by one or more processors such that the steps of the method 600 may be performed in part or in whole by the application server 122 or the client device 106, and in particular the modules 200-210 comprising the contextual ontology application 126.

At operation 605, the communication module 200 may receive a user input. In response to the user input, the context data module 204 may gather context data corresponding to the input at operation 610. The context data module 204 may then deliver the context data to the ontology retrieval module 206. Upon receiving the context data, at operation 615, the ontology retrieval module 206 may select a corresponding ontology stored in the ontology database 202. The ontology retrieval module 206 may then provide the corresponding ontology to the predictive typing entry module 208. In some embodiments, the ontology retrieval module 206 may stream the corresponding ontology to the user. In further embodiments, the ontology retrieval module 206 may stream two or more corresponding ontology to the user, such that the ontology may be combined to form a larger more comprehensive ontology.

At operation 620, the predictive typing entry module 208 may use the corresponding ontology and the context data to provide the user with a text suggestion through the presentation module 210. Upon receiving the text suggestion from the presentation module 210, the user may choose to select the suggestion, or ignore it. In some embodiments, the predictive typing entry module 208 may begin generating predictive typing entry while the corresponding ontology is only partially streamed.

Figure 7:
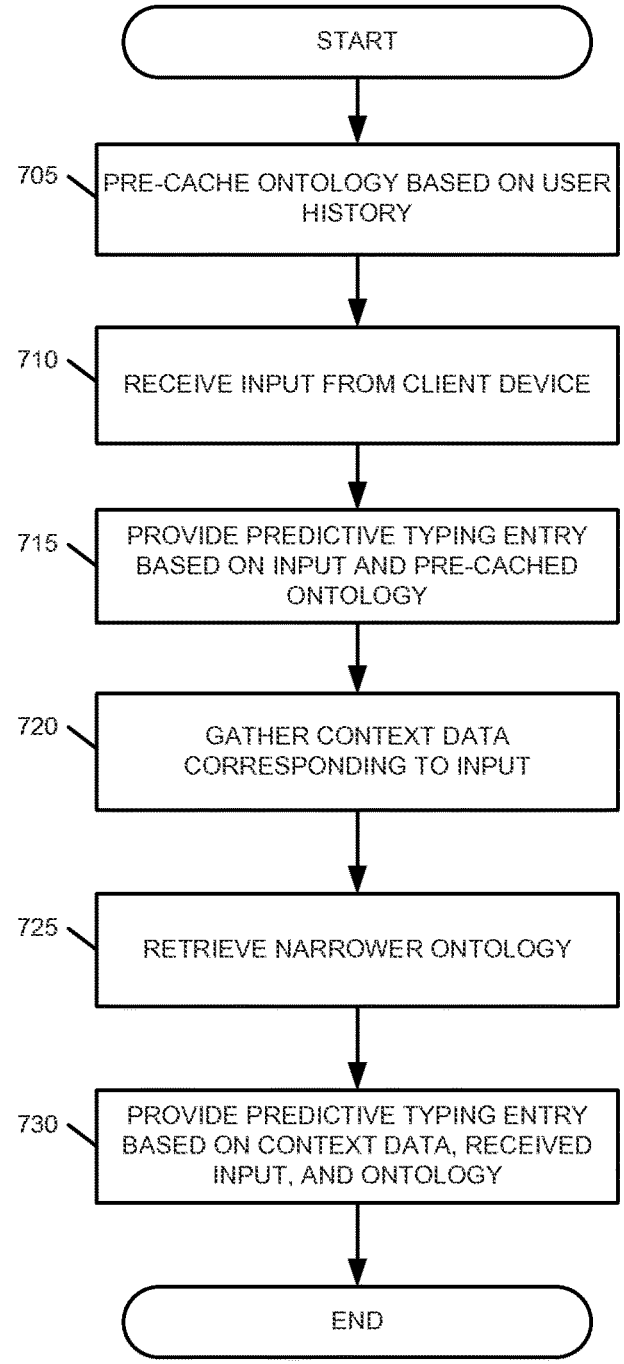
FIG. 7 is a flowchart illustrating an example method of pre-caching an ontology and providing a context based predictive typing entry, consistent with some example embodiments.

FIG. 7 is a flowchart illustrating a method 700 by which the contextual ontology application 126 may pre-cache a corresponding ontology before receiving a user input. At operation 705, the contextual ontology application 126 may pre-cache an ontology based on a user history. The user history may include a user's transaction history, previous listings a user has viewed or created, a user's search query history, and the ontology most often used by a user. The communication module 200 may then receive an input from a user at operation 710. At operation 715, in response to the user input, the predictive typing entry module 208 may immediately provide the user with text suggestions based on the received input and the pre-cached ontology, which the user may choose to accept or reject.

At operation 720, the context data module 204 may gather context data corresponding to the user input. The context data module 204 may then provide the context data to the ontology retrieval module 206. At operation 725, the ontology retrieval module 206 may then provide a narrower and more specific ontology to the predictive typing entry module 208, based on the user input, the pre-cached ontology, and the context data gathered by the context data module 204. At operation 730, a predictive typing entry may be provided by the predictive typing entry module 208 and the presentation module 210.

Figure 8:
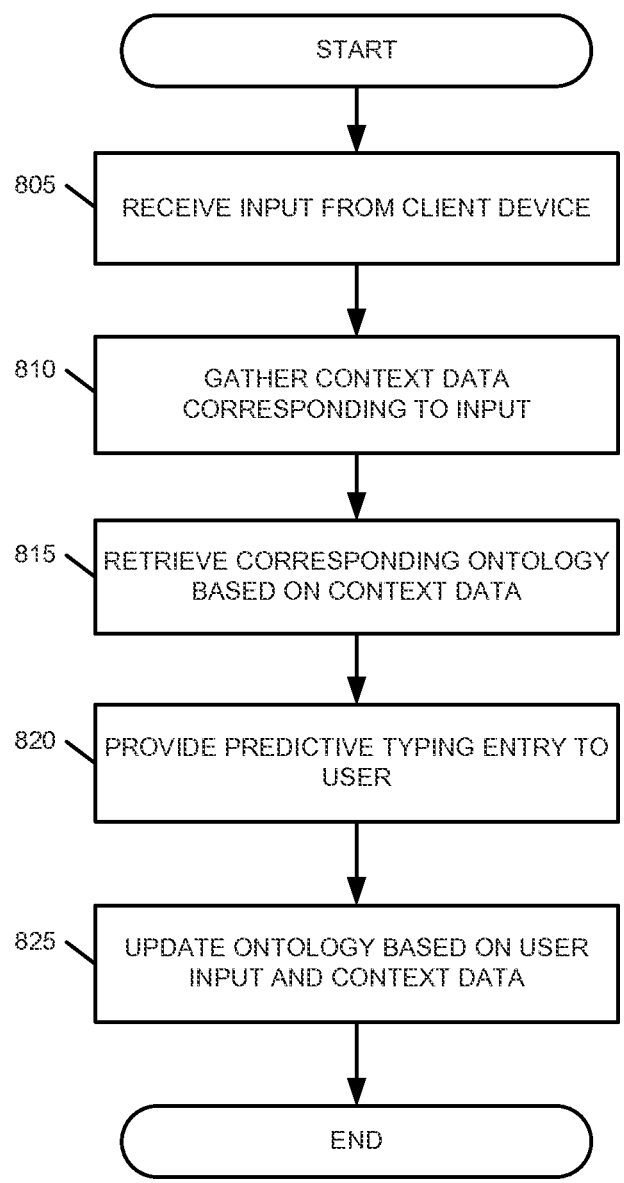
FIG. 8 is a flowchart illustrating an example method for updating an ontology based on user input and context data, consistent with some example embodiments.

FIG. 8 illustrates a method 800 for updating an ontology within the ontology database 202 with user input data. The user input data can include information associated with the text inputs and accepted or rejected predictive typing entry suggestions. For example, a user may reject a particular text suggestion provided by the predictive typing entry module 208. As a result, the contextual ontology application 126 may update the corresponding ontology to eliminate a particular text suggestion in the given context. In further example embodiments, the contextual ontology application 126 may update the corresponding ontology to include the text input which the user provides in the place of the suggestion. In this way, the ontology may be regularly updated with relevant information corresponding to a particular context.

At operation 805, the communication module 200 may receive a user input. In response, at operation 810, the context data module 204 may gather context data corresponding to the input. The context data module 204 may then deliver the context data to the ontology retrieval module 206. Upon receiving the context data, at operation 815, the ontology retrieval module 206 may select a corresponding ontology stored in the ontology database 202. The ontology retrieval module 206 may then provide the corresponding ontology to the predictive typing entry module 208. At operation 820, the predictive typing entry module 208 may then generate a text suggestion and deliver the suggestion to the presentation module 210, which may then provide the suggestion to the user. The user may then choose to accept and use the suggested text, or alternatively in some embodiments may reject the suggestion and provide their own input text. At operation 825, the ontology retrieval module 206 may update the corresponding ontology based on the user's response to the suggestion. For example, should the user accept the suggestion, the ontology retrieval module 206 may update the corresponding ontology by increasing its rank in relation to other ontologies. However, should the user reject the suggestion and provide input text, the ontology retrieval module 126 may demote the rank of the corresponding ontology, and may also add the provided input text from the user to the ontology for future use.

In further embodiments, the ontology retrieval module 206 may also create new ontology, based on the typed inputs of the user. The ontology retrieval module 206 may create a new ontology based on the typed input, and update the new ontology with suggested keywords provided to the user real-time.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmabe gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 9:
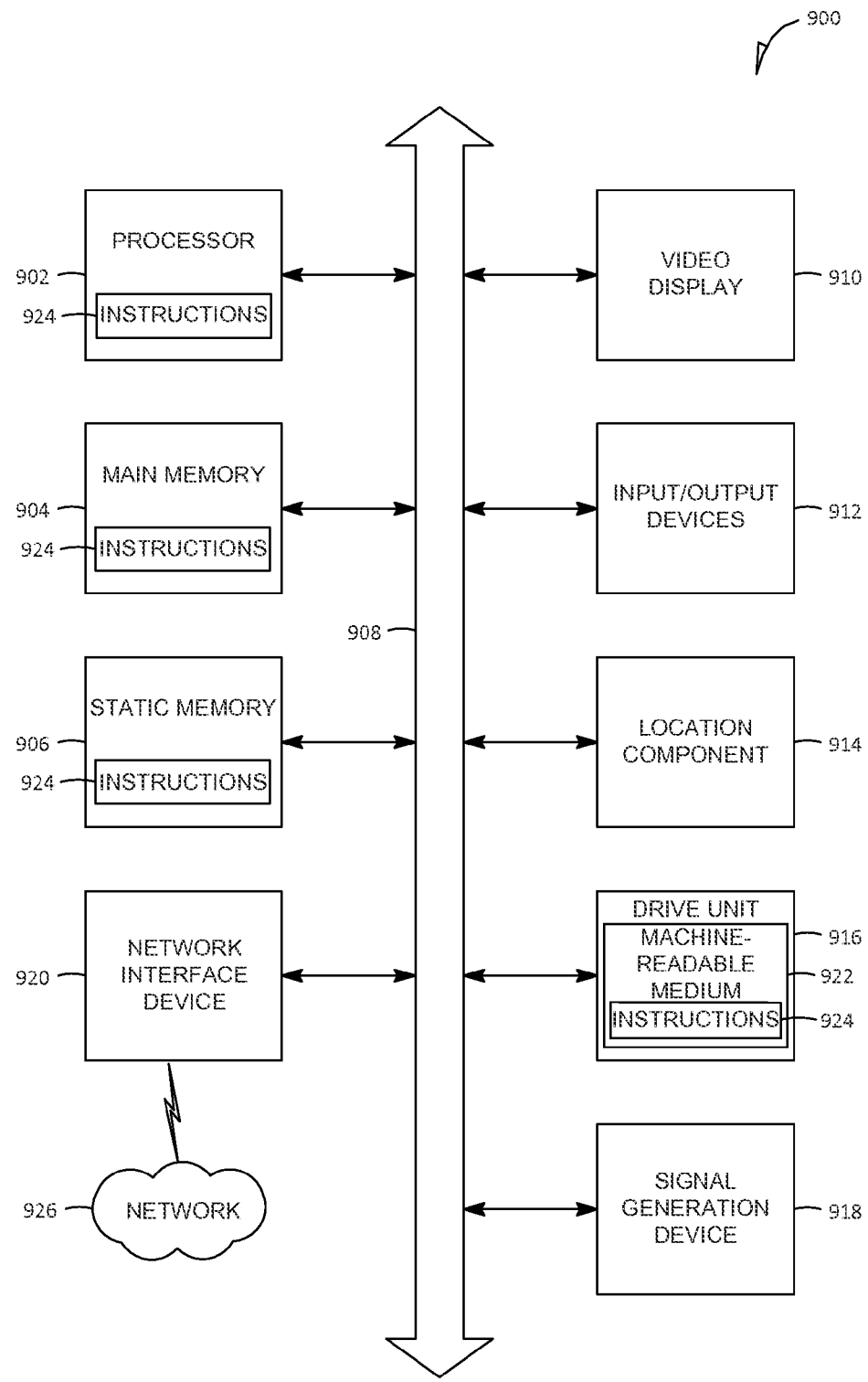
FIG. 9 is a diagrammatic representation of a machine in the example form of a computer system within which a set of instructions for causing the machine to perform any one or more of the methodologies discussed herein may be executed.

FIG. 9 is a diagrammatic representation of a machine in the example form of a computer system 900 within which a set of instructions 924 for causing the machine to perform any one or more of the methodologies discussed herein may be executed. The computer system 900 may correspond to the client device 106, the third party server 114, or the application server 122, consistent with some embodiments. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a PDA, a cellular telephone, a smart phone (e.g., iPhone®), a tablet computer, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904, and a static memory 906, which communicate with each other via a bus 908. The computer system 900 may further include a video display unit 910 (e.g., a liquid crystal display (LCD) or a cathode ray tube (CRT)). The computer system 900 also includes one or more input/output (I/O) devices 912, a location component 914, a disk drive unit 916, a signal generation device 918 (e.g., a speaker), and a network interface device 920. The I/O devices 912 may, for example, include a keyboard, a mouse, a keypad, a multi-touch surface (e.g., a touchscreen or track pad), a microphone, a camera, and the like.

The location component 914 may be used for determining a location of the computer system 900. In some embodiments, the location component 914 may correspond to a GPS transceiver that may make use of the network interface device 920 to communicate GPS signals with a GPS satellite. The location component 914 may also be configured to determine a location of the computer system 900 by using an internet protocol (IP) address lookup or by triangulating a position based on nearby mobile communications towers. The location component 914 may be further configured to store a user-defined location in the main memory 904 or the static memory 906. In some embodiments, a mobile location enabled application may work in conjunction with the location component 914 and the network interface device 920 to transmit the location of the computer system 900 to an application server or third party server for the purpose of identifying the location of a user operating the computer system 900.

In some embodiments, the network interface device 920 may correspond to a transceiver and antenna. The transceiver may be configured to both transmit and receive cellular network signals, wireless data signals, or other types of signals via the antenna, depending on the nature of the computer system 900.

Machine-Readable Medium

The disk drive unit 916 includes a machine-readable medium 922 on which is stored one or more sets of data structures and instructions 924 (e.g., software) embodying or used by any one or more of the methodologies or functions described herein. The instructions 924 may also reside, completely or at least partially, within the main memory 904, the static memory 906, and/or the processor 902 during execution thereof by the computer system 900, with the main memory 904 and the processor 902 also constituting machine-readable media.

Consistent with some embodiments, the instructions 924 may relate to the operations of an operating system (OS). Further, the instructions 924 may relate to operations performed by applications (commonly known as "apps"), consistent with some embodiments. One example of such an application is a mobile browser application that displays content, such as a web page or a user interface using a browser.

While the machine-readable medium 922 is shown in an example embodiment to be a single medium, the term "machine-readable medium" may include a single medium or multiple media (e.g., a centralized or distributed database, and/or associated caches and servers) that store the one or more data structures or instructions 924. The term "machine-readable medium" shall also be taken to include any tangible medium that is capable of storing, encoding, or carrying instructions (e.g., instructions 924) for execution by the machine and that cause the machine to perform any one or more of the methodologies of the present disclosure, or that is capable of storing, encoding, or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., erasable programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

Furthermore, the tangible machine-readable medium is non-transitory in that it does not embody a propagating signal. However, labeling the tangible machine-readable medium "non-transitory" should not be construed to mean that the medium is incapable of movement—the medium should be considered as being transportable from one real-world location to another. Additionally, since the machine-readable medium is tangible, the medium may be considered to be a machine-readable device.

Transmission Medium

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium that is capable of storing, encoding, or carrying the instructions 924 for execution by the machine, and includes digital or analog communications signals or other intangible media to facilitate communication of such software.

Although the embodiments of the present inventive subject matter have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," and so forth are used merely as labels, and are not intended to impose numerical requirements on their objects.

What is claimed:

1. A method comprising:
   receiving a typed input from a client device of a user during a communication session;
   gathering context data corresponding to the communication session of the user in response to the receiving of the typed input;
   retrieving an ontology from a database of ontologies based on the context data, the ontology comprises a set of keywords related to the context data of the communication session;
   selecting a keyword from among the set of keywords of the ontology based on the typed input;
   causing display of a predictive typing entry at the client device, the predictive typing entry including the keyword;
   receiving a rejection of the predictive typing entry from the client device;
   removing the keyword from the set of keywords of the ontology in response to the receiving of the rejection;
   assigning a rank to the ontology in response to the rejection of the predictive typing entry, the rank based on a frequency of use of the ontology, a conversion rate, a usage behavior, and an accuracy of the text suggestions, wherein the frequency of use is a total number of times the ontology is used by the user, as compared with other ontologies in the database of ontologies, wherein a higher conversion rate corresponds to a higher overall rank within the database of ontologies, wherein the usage behavior is based on the keywords used from the ontology, and wherein the accuracy of the predictive typing suggestion is calculated as the ratio of predictive typing suggestions rejected by the user against predictive typing suggestions accepted by the user; and
   pre-caching the ontology with the highest assigned rank at a memory of the client device of the user.

2. The method of claim 1, wherein the context data includes one or more parameters that include a user transaction history, a user query history, a content of a website, and a content of the communication session.

3. The method of claim 1, further comprising communicating the predictive typing entry as a text suggestion, wherein the text suggestion includes a word, phrase, numerical quantity, price term, or combination thereof, and the method further comprises:
   receiving a custom user input that includes a new keyword that replaces the rejected text suggestion; and
   updating the ontology to include the new keyword in response to the receiving the rejection.

4. The method of claim 1, wherein the communication session includes a first time period and a second time period, and wherein the method further comprises:

receiving a first typed input from a user during the first period in a communication session;
gathering first context data corresponding to the first typed input and the first period in the communication session;
retrieving a first ontology, from the database of ontologies, based on the first context data;
causing display of the predictive typing entry based on the first typed input, the first context data and the first ontology;
receiving a second typed input from the user during the second time period in the communication session;
gathering second context data corresponding to the second typed input and the second period in the communication session;
retrieving a second ontology, from the database of ontologies, based on the second context data; and
providing the predictive typing entry based on the second typed input, the second context data and the second ontology.

5. The method of claim 1 wherein the typed input is a first typed input, the communication is a first communication session, and the method further comprises:
saving the ontology locally at a memory of the client device;
receiving a second typed input from the client device during a second communication session; and
recalling the ontology from the memory of the client device, in response to the receiving of the second typed input.

6. The method of claim 1, further comprising:
creating a new ontology, based on the context data and the typed input;
storing the new ontology in the database of ontologies; and
updating the new ontology with a subsequent related user input, wherein the subsequent related user input corresponds with the context data and the user input.

7. The method of claim 1, wherein the two or more ontology includes a baseline ontology and a category specific ontology, and the method further comprises:
identifying a most frequently used keyword among the keywords of the ontologies; and
causing display of the most frequently used keyword as the predictive typing entry.

8. The method of claim 1, wherein the ontology includes two or more ontology components, and wherein the method further comprises:
dynamically loading the ontology and the two or more ontology components starting with a broadest ontology component; and
providing additional narrower ontology components based on the context data and the input.

9. The method of claim 1, further comprising:
pre-caching the ontology based on a previous context data associated with a previous communication session, the user transaction history, and the user query history.

10. The system of claim 9, wherein the ontology comprises at least a broad ontology component and a narrow ontology component, and wherein the operations further comprise:
retrieving the broad ontology component of the ontology in response to the typed input; and
retrieving the narrow ontology component in response to the rejection of the predictive typing entry.

11. The system of claim 9, wherein the operations further comprise:

receiving a custom user input to replace the rejected text suggestion, the custom user input including a new keyword; and
updating the ontology to include the new keyword in response to the receiving of the rejection.

12. The system of claim 9, wherein the operations further comprise: accessing a user history of the user, the user history including a frequency of use of the
ontology by the user, wherein the frequency of use of the ontology is a number of times that the ontology has been retrieved for the user; and
wherein the ranking the ontology is based on the frequency of use.

13. A system to dynamically load contextual ontologies comprising:
one or more processors of a machine; and
a memory storing instructions that, when executed by at least one processor among the one or more processors, causes the machine to perform operations comprising:
receiving a typed input from a client device of a user during a communication session;
gathering context data corresponding to the communication session of the user in response to the receiving of the typed input;
retrieving an ontology from a database of ontologies based on the context data, the ontology comprises a set of keywords related to the context data of the communication session;
selecting a keyword from among the set of keywords of the ontology based on the typed input;
causing display of a predictive typing entry at the client device, the predictive typing entry including the keyword;
receiving a rejection of the predictive typing entry from the client device;
removing the keyword from the set of keywords of the ontology in response to the receiving of the rejection;
assigning a rank to the ontology in response to the rejection of the predictive typing entry, the rank based on a frequency of use of the ontology, a conversion rate, a usage behavior, and an accuracy of the text suggestions, wherein the frequency of use is a total number of times the ontology is used by the user, as compared with other ontologies in the database of ontologies, wherein a higher conversion rate corresponds to a higher overall rank within the database of ontologies, wherein the usage behavior is based on the keywords used from the ontology, and wherein the accuracy of the predictive typing suggestion is calculated as the ratio of predictive typing suggestions rejected by the user against predictive typing suggestions accepted by the user; and
pre-caching the ontology with the highest assigned rank at a memory of the client device of the user.

14. A non-transitory machine-readable storage medium storing instructions that, when executed by a processor, causes the processor to perform operations comprising:
receiving a typed input from a client device of a user during a communication session;
gathering context data corresponding to the communication session of the user in response to the receiving of the typed input;
retrieving an ontology from an ontology database based on the context data, the ontology comprises a set of keywords related to the context data of the communication session;

selecting a keyword from among the set of keywords of the ontology based on the typed input;

causing display of a predictive typing entry at the client device, the predictive typing entry including the keyword;

receiving a rejection of the predictive typing entry from the client device;

removing the keyword from the set of keywords of the ontology in response to the receiving of the rejection;

assigning a rank to the ontology in response to the rejection of the predictive typing entry, the rank based on a frequency of use of the ontology, a conversion rate, a usage behavior, and an accuracy of the text suggestions, wherein the frequency of use is a total number of times the ontology is used by the user, as compared with other ontologies in the database of ontologies, wherein a higher conversion rate corresponds to a higher overall rank within the database of ontologies, wherein the usage behavior is based on the keywords used from the ontology, and wherein the accuracy of the predictive typing suggestion is calculated as the ratio of predictive typing suggestions rejected by the user against predictive typing suggestions accepted by the user; and pre-caching the ontology with the highest assigned rank at a memory of the client device of the user.

15. The non-transitory machine-readable storage medium of claim 14, wherein the ontology comprises at least a broad ontology component and a narrow ontology component, and wherein the operations further comprise:

retrieving the broad ontology component of the ontology in response to the typed input; and retrieving the narrow ontology component in response to the rejection of the predictive typing entry.

16. The non-transitory machine-readable storage medium of claim 14, wherein the predictive typing entry is a text suggestion, and wherein the operations further comprise:

receiving a custom user input that includes a new keyword that replaces the rejected text suggestion; and updating the ontology to include the new keyword in response to the receiving the rejection.

* * * * *